United States Patent Office 2,911,384
Patented Nov. 3, 1959

2,911,384

OXYGENATED CRYSTALLINE POLYPROPYLENE, METHOD OF MAKING, AND WAX COMPOSITION CONTAINING SAME

William E. Thompson, Wallingford, and George S. Leeder, Green Ridge, Pa., assignors to Sun Oil Company, Philadelphia, Pa., a corporation of New Jersey No Drawing. Application February 5, 1957
Serial No. 638,222

6 Claims. (Cl. 260—28.5)

This invention relates to a new composition of matter, methods for preparing the new composition of matter, and to new compositions incorporating the new composition of matter as a component thereof. More particularly, the present invention relates to the conversion of certain polymers of propylene to other products by oxidation, to the new products obtained from the conversion, and to new compositions containing as a component such new products.

Propylene has heretofore been polymerized to relatively low molecular weight liquids or soft amorphous solids through the use of polymerization catalysts such as aluminum trichloride, boron trifluoride, and the like. Propylene can be polymerized to relatively high molecular weight solid polymers by contacting propylene with a dispersion of titanium trichloride and an activator such as aluminum triethyl maintained in an inert, liquid reaction medium. Generally such processes do not provide for regulation of the molecular weights of the products so that the products obtained have molecular weights of above about 5,000 and generally within the range of from about 50,000 to 300,000. A proportion of the solid products obtained with the mentioned catalyst appears crystalline, i.e., exhibits a crystalline structure by X-ray analysis. The crystalline polymer is substantially insoluble in the usual hydrocarbon solvents, such as the paraffins, including for example, the pentanes, hexanes, octanes, decanes, and the like, and is insoluble in oxygen-containing organic solvents such as aldehydes and ketones. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "polypropylene," possess properties which make them suitable for many applications, the high insolubility renders them unsuitable for many other applications. For example, polypropylene cannot be used as a solution, is not miscible with hydrocarbons or the like such as wax, and hence is unsatisfactory for use in formulating wax compositions or the like. Also, the melt index of the polymer is very low so that the preparation of articles of manufacture by extrusion is difficult.

An object of the present invention is to provide a new composition of matter which is relatively soluble in hydrocarbons. Another object is to provide a derivative of polypropylene which is relatively soluble in hydrocarbons, and which is miscible with petroleum waxes. A further object is to provide a process for the oxidation of polypropylene to form new compositions of matter. Another object is to provide a process for adjusting properties of polypropylene, such as molecular weight and melt index, to desired values. A further object is to provide a new composition of matter which incorporates as a component thereof the product obtained by oxidizing crystalline polypropylene.

It has now been found that by heating crystalline polypropylene to a temperature above its melting point in an atmosphere containing an adjusted quantity of oxygen, and maintaining such conditions for an appropriate period of time, a limited quantity of oxygen combines with the polypropylene to form a new composition of matter which is relatively soluble in hydrocarbons and oxygen-containing solvents such as aldehydes and ketones, and which has a relatively high melt index. By regulation of the reaction conditions, as hereinafter described, the molecular weights of the products can be predetermined. It has been further found that by performing the process of the invention in an inert atmosphere, i.e., in the absence of oxygen, the molecular weights and melt indices of the products can be adjusted to desired values without oxidation.

In accordance with an embodiment of the present invention, crystalline polypropylene is heated to a temperature above its melting point while in contact with an atmosphere containing an adjusted quantity of oxygen. When the desired conversion has occurred, as hereinafter described, the polymer is cooled to solid state. At least a major proportion of the resulting product is crystalline, and the product is substantially soluble in hydrocarbons and oxygen-containing organic solvents, and is miscible with petroleum waxes.

The crystalline polypropylene used in the process of the invention is prepared by polymerizing propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide or 1:1 to 12:1 is used. Temperatures of from about 32° F. to 302° F. are suitable. Atmospheric pressure is preferably used although elevated pressures can be used to advantage in that the polymerization reaction proceeds at a faster rate at such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably such agitation provides for comminuting the catalyst during the contacting with the catalyst deactivating liquid. The polymer is then repeatedly washed to remove at least a major proportion of the residual inorganic material from the catalyst, and is then dried. The described procedure yields a product which is a mixture of crystalline and amorphous polypropylene. The amorphous polymer can be removed by dissolution in a hydrocarbon solvent at an elevated temperature, for example, in n-heptane, isooctane, tetralin, decalin or the like. The resulting crystalline polypropylene is then used in the process of the invention. However, a small amount of the amorphous polymer, say up to about 10% by weight, can be present with the crystalline polymer and good results obtained. The crystalline polypropylene will generally have a molecular weight of from about 50,000 to 300,000 and usually from about 90,000 to 250,000, a melting point of from about 321° F. to 338° F., and exhibits a crystalline structure by X-ray analysis.

In accordance with an embodiment of the present invention, essentially crystalline polypropylene is heated to a temperature of above its melting point, preferably to a temperature of from about 338° F. to 464° F. The molten polymer is maintained at the elevated temperature in contact with an atmosphere containing a desired quantity of oxygen. The temperature and oxygen content are selected so that the desired amount of oxidation and reduction in molecular weight of the polymer product is obtained. At temperatures in the upper portion of the stated range, say from 410° F. to 464° F., the molecular weight decrease is enhanced. Also, with an atmosphere containing a relatively high oxygen content, the rate of oxidation is enhanced. However, molecular weight reduction and oxidation do not appear to be directly related, i.e., a substantially molecular weight reduction with but slight oxidation, or substantial oxidation with but relatively small molecular weight reduction, can be achieved. Accordingly, the temperature and quantity of oxygen employed are adjusted so that the resulting product has desired properties. The oxygen content of the atmosphere can vary from about 2% to about 40% when oxidation is desired. An atmosphere of air can be used in many instances. Mixtures of oxygen and an inert gas such as nitrogen provide for convenient regulation of the oxygen. Also, subatmospheric pressures can be used to decrease oxygen content such as of air, or elevated pressures can be used to enhance the dissolution of oxygen in the molten polypropylene. Stirring of the molten polypropylene is advantageously maintained during the contact with oxygen to insure obtaining a homogeneous product. The time of heating is dictated by the desired properties of the resulting product. Generally a time of from 0.5 to 60 hours, and usually from 1 to 24 hours, will be used. The regulation of the reaction conditions and variations in the quantity of oxygen employed are more fully explained in connection with the following examples.

At the conclusion of the oxidation step, the product is cooled and, in some instances, it is advantageous to add an oxidation stabilizer thereto which substantially inhibits further oxidation of the product. The use of such a stabilizer, however, is unnecessary, especially when the product is to be used at relatively low temperatures.

The products of the invention comprise crystalline polypropylene combined with from about 0.2% to 4% by weight oxygen and have molecular weights of from about 5,000 to 200,000. During the oxidation step, a portion of the crystalline polymer may be converted to amorphous form. However, such conversion is relatively minor and in accordance with the invention, at least a major proportion, above 50%, of the final polypropylene is crystalline. The products are characterized by increased solubility in hydrocarbons and oxygen-containing organic solvents, by increased melt index, and by compatability with petroleum waxes when compared to polymers of propylene heretofore described.

The following examples illustrate the process, products and compositions of the invention, in which "parts" refer to parts by weight. In the examples, the polypropylene used was obtained by contacting propylene with a dispersion of titanium trichloride in n-heptane using aluminum triisobutyl as an activator.

EXAMPLE 1

Several polypropylenes were prepared which had different molecular weights as indicated in the examples. Such polypropylenes had a density of about 0.91, a melting point of about 329° F., and a melt index of about 0.1. The polypropylenes contained over 90% crystalline polypropylene.

Polypropylene from three separate preparations, designated in Table I as polymer A, B and C, respectively, were heated to 374° F. for varying lengths of time in an apparatus which excluded air. The polymer consisted of at least 90% crystalline propylene and contained about 1% by weight of dissolved oxygen. The melt index and molecular weights of the products were then determined. The results obtained are given in following Table I:

*Table I*

|  | Time (min.) | Melt Index | Mol. Wt. |
| --- | --- | --- | --- |
| Polymer A | 4 | 0.06 | 150,000 |
|  | 19 | 0.40 | 96,000 |
|  | 34 | 0.77 | (1) |
|  | 49 | 1.61 | 90,000 |
| Polymer B | 4 | 3.16 | 62,000 |
|  | 19 | 6.05 | 56,000 |
|  | 34 | 6.97 | 43,000 |
|  | 49 | 10.60 | 40,000 |
| Polymer C | 4 | 0.01 | 160,000 |
|  | 49 | 0.34 | 96,000 |

[1] Not determined for this product.

By "melt index" is meant the weight of polymer, expressed in grams, extruded through an orifice 0.0823 inch in diameter from a barrel 0.3760 inch in diameter under the force of a piston weighing 2160 grams, the polymer being maintained at 374° F. during the extrusion.

EXAMPLE 2

Crystalline polypropylene was prepared, as above described, by introducing 9.9 parts of titanium trichloride and 7.76 parts of aluminum triisobutyl into a reactor together with about 2022 parts of n-heptane. The temperature of the mixture was adjusted to 194° F. and propylene was then introduced into the reactor to a pressure of 100 p.s.i.g. Constant mechanical agitation was maintained for 11.38 hours, during which time the temperature was maintained at about 192° F. to 194° F. and the pressure at substantially 100 p.s.i.g. by periodic addition of propylene to the reactor. The reaction was stopped and the catalyst deactivated and removed by contacting the polypropylene product with a solution of nitric acid in isopropyl alcohol with vigorous agitation. The polymer product was separated and contacted with n-pentane. 246.6 parts of the polymer were soluble in the pentane and were recovered therefrom as an amorphous product. 1352.5 parts of the polymer were insoluble in the pentane and were recovered as crystalline polypropylene. This crystalline polypropylene had a molecular weight of 150,000 and a melting point of 331° F.

The crystalline polypropylene was heated at atmospheric pressure in an atmosphere of air at a temperature of 464° F. for varying periods of time. The oxygen contents and melting points of the products were determined. The time of heating and results obtained are shown in following Table II:

*Table II*

| Time (Hours) | Melting Point (° F.) | Oxygen Content (Weight Percent) |
| --- | --- | --- |
| 0.67 | 295–300 | 0.27 |
| 22 | 300 | 2.98 |
| 48 | 275–280 | 3.0 |
| 72 | 250–261 | 3.36 |

Infra-red spectroscopy indicated an increased concentration of oxygenated material as shown in above Table II, the oxygenated material apparently containing carbonyl groups and possibly hydroxyl groups. On prolonged heating in air, not more than about 4% by weight of oxygen can be introduced into the polypropylene.

EXAMPLE 3

It was desired to increase the melt index of a polypropylene having a molecular weight of 140,000 and a melt index of 0.1, prepared as described in Example 2, without substantially decreasing the molecular weight and without introducing oxygen into the polymer. The polypropylene was heated to about 374° F. in a vacuum, the pressure being 0.25 mm. of mercury. After 16 hours the polymer was cooled. The molecular weight of the product was 130,000 and the melt index was 0.14.

It was desired to convert a portion of the same polypropylene having a molecular weight of 140,000 to a polymer of much lower molecular weight and greatly increased melt index. The polypropylene was heated at about 374° F. in air for 16 hours. The polymer was then cooled. The product had a molecular weight of 35,000 and a melt index of 10.

By adjusting the temperature, oxygen content of the atmosphere in contact with the polymer, and time of heating, polypropylene products of desired molecular weights and properties are thus obtained.

EXAMPLE 4

Crystalline polypropylene prepared as described in Example 2 was heated at about 399° F. for 48 hours in contact with air. The resulting product contained about 3% oxygen and had a molecular weight of about 90,000. This product was compounded with various waxes to form new compositions of matter.

About 34.8 parts of a microcrystalline wax obtained from petroleum having a melting point of about 193° F. (ASTM D127-49), a viscosity of about 85 SUS at 210° F. (ASTM D446-39) and a needle penetration at 77° F. of about 5 (100 gram load for 5 seconds; ASTM D5-52) and about 3.3 parts of the oxygenated polypropylene were heated to 230° F. A clear solution was formed which, on cooling, gave a homogeneous composition. Repeating the procedure by heating the wax and oxygenated polypropylene to about 300° F., over 16.5 parts of the oxidized polypropylene were incorporated in 34.9 parts of the wax to form a homogeneous composition.

The foregoing procedure was repeated using a paraffin wax obtained from petroleum having a melting point of about 125° F., a viscosity of about 79.5 SUS at 210° F., and a needle penetration at 77° F. of 21. 20.4 parts of the oxidized polypropylene were incorporated in 25 parts of the molten wax at 300° F. A homogeneous composition was obtained. Another product was prepared in like manner with the same materials, except that the wax-oxygenated polypropylene composition contained 20% by weight of the oxidized polypropylene. The melting point of this composition was from 129° F. to 135° F.

In general, from about 1 to 40 parts of oxidized crystalline polypropylene will be combined with 100 parts of wax to form the compositions of the invention, but more or less can be used in certain applications with good results. For example, as little as 0.5 part of oxidized crystalline polypropylene in 100 parts of wax enhances the wax for coating purposes.

Polypropylene as heretofore prepared is substantially immiscible with wax. Repeating the foregoing preparations of compositions using polypropylene as heretofore described results in heterogeneous compositions. For example, adding 0.3 part of the polypropylene from which the oxygenated products of the invention were prepared to 33.8 parts of the same paraffin wax as used above, at a temperature of 210° F., gave no indication of solubility in the wax and the resulting composition was heterogeneous. At 427° F., as little as 2.3 parts of the polypropylene would not dissolve in the wax.

The wax compositions of the invention are especially useful for use in polish formulations and assist in obtaining a high gloss. The compositions are also useful for coating paper or cardboard products such as milk containers, and for coating food products for freezing, and the like.

EXAMPLE 5

In order to demonstrate the differences in solubility in the oxygenated compounds of the present invention and the polypropylene from which the oxygenated products are obtained, solubility measurements in oxygenated solvents were made as follows:

To 27 parts of diisobutyl ketone (boiling point 334° F.) was added 0.3 part of crystalline polypropylene having a melting point of about 331° F. At 180° F. the polypropylene gave no indication of dissolving in the ketone. Repeating this procedure using oxygenated polypropylene having a melting point of about 261° F. and having an oxygen content of 3.12%, 1.9 parts readily dissolved in 29.6 parts of diisobutyl ketone at 160° F. On continued heating and addition of polypropylene, at least 5.4 parts were readily dissolved at 270° F.

To 31.7 parts of capric aldehyde (boiling point 405° F.) at 755 mm. (mercury pressure) was added 0.7 part of polypropylene as above described. On heating to a temperature of 270° F., the polypropylene appeared completely insoluble. Substituting oxygenated polypropylene as above described, 6.4 parts thereof readily dissolved in 26.1 parts of the capric aldehyde at 230° F.

The oxygen-containing crystalline polypropylene products of the invention are useful for compounding with other materials such as wax, for the preparation of films for packaging products such as food products, for coating containers for fluids, for preparing fluid containers, for preparing conduits for transporting fluids, and the like. Such articles can be prepared by molding, extrusion, casting or other fabrication processes.

The invention claimed is:

1. A new composition of matter comprising crystalline polypropylene chemically combined with from 0.2%–4% by weight oxygen, said composition having been prepared by contacting crystalline polypropylene having a molecular weight in the range of 50,000 to 300,000 at a temperature of from its melting point to about 464° F. with an atmosphere containing from about 2% to about 40% of molecular oxygen.

2. Composition according to claim 1 wherein the amount of oxygen combined with the polypropylene is about 3%.

3. Process for the preparation of oxygen-containing crystalline polymers of polypropylene which comprises contacting crystalline polypropylene having a molecular weight in the range of 50,000 to 300,000 at a temperature of from its melting point to about 464° F. with an atmosphere containing from about 2% to about 40% of molecular oxygen for a time sufficient to introduce 0.2–4% by weight of oxygen into the polymer.

4. Process according to claim 3 wherein said time is sufficient to introduce about 3% by weight of oxygen into the polymer.

5. A new composition of matter comprising a petroleum wax containing from about 0.5 to about 40 parts, per 100 parts of wax, of crystalline polypropylene having from about 0.2% to about 4% by weight of oxygen chemically combined therewith, the oxygen-containing polypropylene having been prepared by the process of claim 3.

6. A new composition of matter comprising a petroleum wax containing from about 0.5 to about 40 parts, per 100 parts of wax, of crystalline polypropylene having about 3% by weight of oxygen chemically combined therewith, the oxygen-containing polypropylene having been prepared by the process of claim 4.

References Cited in the file of this patent

UNITED STATES PATENTS

| | | |
|---|---|---|
| 2,461,966 | Davis | Feb. 15, 1949 |
| 2,471,102 | Fish | May 24, 1949 |
| 2,601,109 | Fish | June 17, 1952 |

OTHER REFERENCES

J. Am. Chem. Soc., 77, March 20, 1955, pages 1708–1710.